United States Patent
Groeneveld

(10) Patent No.: US 6,371,162 B1
(45) Date of Patent: Apr. 16, 2002

(54) ELECTRIC ACTUATOR FOR FLUID CONTROL VALVES

(75) Inventor: Floris J. Groeneveld, Hengelo (NL)

(73) Assignee: Fisher Controls International, Inc., Clayton, MO (US)

(*) Notice: Subject to any disclaimer, the term of this patent is extended or adjusted under 35 U.S.C. 154(b) by 0 days.

(21) Appl. No.: 09/553,579

(22) Filed: Apr. 20, 2000

(51) Int. Cl.[7] .............................. F17D 3/01; F16K 31/02
(52) U.S. Cl. ................. 137/613; 137/624.2; 251/129.04
(58) Field of Search ..................... 137/624.2, 624.18, 137/613; 251/129.04

(56) References Cited

U.S. PATENT DOCUMENTS

| | | | |
|---|---|---|---|
| 4,034,774 A | * 7/1977 | Clymer et al. | 137/624.2 X |
| 4,165,532 A | * 8/1979 | Kendall et al. | 137/624.2 X |
| 4,177,395 A | 12/1979 | Hore | |
| 4,185,650 A | * 1/1980 | Neves et al. | 137/624.2 X |
| 4,209,131 A | * 6/1980 | Barash et al. | 137/624.2 X |
| 4,231,990 A | * 11/1980 | Jottier | 137/624.2 X |
| 4,257,439 A | * 3/1981 | Mayeaux | 137/624.2 X |
| 4,270,573 A | * 6/1981 | Sturman et al. | 137/624.2 |
| 4,372,334 A | * 2/1983 | Paul, Jr. | 137/613 X |
| 4,445,075 A | 4/1984 | Fry | |
| 4,495,968 A | * 1/1985 | Kist | 137/624.2 |
| 4,546,671 A | 10/1985 | Fry | |
| 4,584,902 A | 4/1986 | Fry | |
| 4,819,149 A | 4/1989 | Sanik et al. | |
| 4,940,011 A | 7/1990 | Wilkerson et al. | |
| 4,994,001 A | 2/1991 | Wilkinson et al. | |
| 5,154,349 A | * 10/1992 | Vaughn | 137/624.2 X |
| 5,287,888 A | * 2/1994 | Geiger | 137/624.2 |
| 5,343,078 A | * 8/1994 | Bullmer | 307/41 |
| 5,428,470 A | 6/1995 | Labriola, II | |
| 5,458,048 A | * 10/1995 | Hohner | 137/624.2 X |
| 5,873,388 A | * 2/1999 | Carpenter | 137/624.2 X |
| 5,934,302 A | * 8/1999 | Nemelka | 137/613 X |
| 5,944,052 A | * 8/1999 | Rashidi | 137/624.18 |
| 6,129,103 A | * 10/2000 | Fields et al. | 137/613 X |
| 6,173,727 B1 | * 1/2001 | Davey | 251/129.04 X |

FOREIGN PATENT DOCUMENTS

| | | |
|---|---|---|
| FR | 2 769 385 | 9/1999 |
| WO | WO 87/04275 | 4/1987 |

* cited by examiner

Primary Examiner—Kevin Shaver
Assistant Examiner—John Bastianelli
(74) Attorney, Agent, or Firm—Marshall, Gerstein & Borun

(57) ABSTRACT

An electro-mechanical actuator for operating a fluid control valve and controlling the operation of one or more field instruments, including other valve actuators. An electro-mechanical actuator has a drive unit and an electric motor driving the drive unit to open and close a fluid control valve to the fully opened and fully closed states under the control of monitoring limit open and limit closed sensors. Auxiliary control output lines connected to other field instruments from the electro-mechanical actuator drive associated fluid control valves to fully open and fully closed states. Limit open sensors and limit closed sensors monitor the valve open and closed state of the other respective field instruments and through a respective pair of auxiliary travel input lines to the electro-mechanical control the field instrument.

3 Claims, 2 Drawing Sheets

ELECTRIC ACTUATOR FOR FLUID CONTROL VALVES

This invention relates generally to actuators for fluid flow control valves and in particular to electro-mechanical actuators.

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as an electro-pneumatic actuator piston or diaphragm unit. In a fluid flow control situation the actuator is responding to the output of a valve positioner or valve controller instrument for accurate throttling control of the valve. Another type of actuator is an electro-mechanical valve actuator containing an electric motor, a motor control unit, and a driving gear configuration with torque limiting devices for controlling the torque applied to the valve shaft. Such an actuator can contain several options, such as speed control, a modulating unit, a position transmitter, etc.

In such process fluid systems, a variety of valve actuators, positioners, or controller instruments, etc., (hereinafter termed "field instruments") are connected to the pipeline system for controlling and/or responding to the fluid flow. Some of the present field instruments are so-called "smart" instruments containing a microprocessor so that such field instruments can be controlled from a remote location for suitably controlling the fluid flow rate, and can also provide a variety of flow characteristics as well as diagnostic information. However, the standard field instruments without microprocessors are still in substantial use and demand due to their low cost compared to a "smart" field instrument. Therefore, in many instances the process fluid system includes a mixture of "smart" field instruments as well as standard field instruments. Typically, such field instruments are connected to a bus from a controller to receive power drawn from the bus in the form of standard 4–20 ma or voltage control signals.

It is desired at times to reduce the need for large numbers of expensive, "smart" field instruments in such process fluid systems and instead to utilize larger numbers of standard field instruments where feasible. As an example, it would be desirable to utilize one expensive "smart" field instrument to control other standard field instruments, and it would be especially desirable to control other standard field instruments of different types, i.e., electro-mechanical actuators, electro-pneumatic actuators, valve controller instruments, etc., via the "smart" instrument. Secondly it is desired to control a variety of such field instruments without requiring the bus be connected to conventional control signals which otherwise draw a substantial amount of power from the bus which has somewhat limited power carrying capacity.

SUMMARY OF THE INVENTION

In accordance with the principles of the present invention, there is provided an electro-mechanical actuator for operating a fluid control valve and controlling the operation of one or more field instruments. In particular there is provided an electro-mechanical actuator including a drive gear having an output coupled to another electro-pneumatic or electro-mechanical actuator. A control unit is coupled to a power source and supplies the open and close power levels in the form of control signals to the electric motor for opening and closing the valve. The control unit includes auxiliary inputs and outputs to control the operation of one or more other field instruments.

The auxiliary control output of the electro-mechanical actuator of the present invention may be connected to a standard electro-mechanical actuator for on/off control of the associated fluid control valve. In addition, the auxiliary control output can be coupled to an electro-pneumatic positioner for activating the positioner and providing suitable on/off controls to correspondingly open and close the associated fluid control valve.

In addition, respective close and open sensors may be provided for monitoring the close and open conditions of the field instruments and providing a suitable signal indication thereof. A personal computer or other host computer is connected to the electro-mechanical actuator of the present invention and can be used to not only control this first electro-mechanical actuator, but through suitable auxiliary control signals from the first electro-mechanical actuator to on/off control a second electro-mechanical actuator as well as an electro-pneumatic positioner or other type of field instrument. Accordingly, respective close and open limits devices for each of the field instruments provides the opened/closed position of the associated valve through the first electro-mechanical actuator to the personal computer or host computer.

The present invention thereby provides a significant advantage in enabling a first electro-mechanical actuator having the ability to provide auxiliary control signals for actuating other field instruments.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Reference may be made to the drawings which illustrate the electro-mechanical actuator of the present invention as utilized in a process control system for controlling the actuation of other field instruments.

Figure 1:
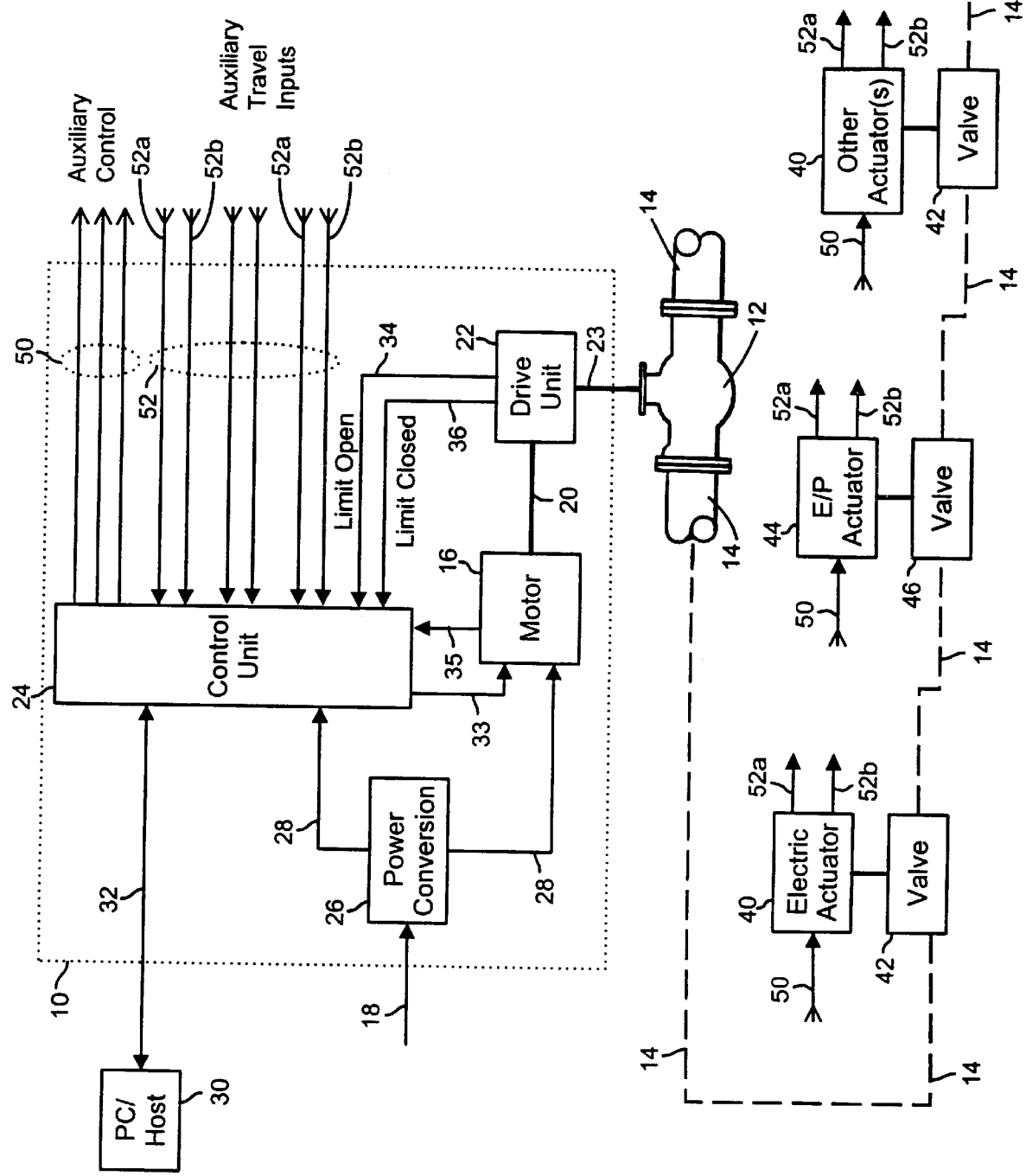
FIG. 1 is a schematic block diagram illustrating an electro-mechanical actuator according to the present invention utilized in a process fluid system having a variety of field instruments.

FIG. 1 illustrates an electro-mechanical actuator 10 according to the present invention controlling a fluid control valve 12 within a process fluid system for controlling the flow of fluid in a pipeline 14. The electro-mechanical actuator 10 includes an electric motor 16 powered by a suitable voltage source on input line 18 and coupled by a drive coupler 20 to a drive gear unit 22. The drive unit 22 may be a harmonic drive gear unit or other suitable drive gear. The output of the drive gear unit 22 is coupled to the rotary shaft 23 of fluid control valve 12 for opening and closing the valve and thereby controlling the fluid flow in the pipeline 14.

A control unit 24 contains a microprocessor. A power converter 26 supplies electrical power to the actuator 10 on input line 28. The control unit 24 receives control signals from a computer 30 such as the illustrated personal computer or host computer on interconnecting line 32. In response to suitable control signals from the computer 30, the control unit 24 supplies the appropriate drive power on line 33 to the electric motor 16 to drive the drive gear 22 and thereby open and close the fluid control valve 12. Travel position data relating to the motor 16 is coupled on line 35 back to the control unit 24. It is understood that the electro-mechanical actuator 10 includes within the control unit 24 well known circuits and suitable software for providing an electronic soft start so as to avoid high start currents in the motor 16, as well as well known circuits and suitable software for controlling the maximum torque to be applied through the drive gear unit 26 to the rotary shaft 23 of the fluid control valve 12.

In operation of the electro-mechanical actuator 10, an initiation signal on input line 32 commands the control unit 24 to provide a power level on line 33 coupled to the electric motor 16 to begin moving the valve 12, for instance, to the fully open position. Limit open sensors monitor the valve opening and provide a limit open signal on line 34 to the control unit 24 when the open limit valve position is reached. Similarly, limit close sensors monitor the valve closing and provide a limit close signal on line 36 to the control unit 24 when the close limit valve position is reached.

As can be seen in FIG. 1, the process fluid system also includes a second electro-mechanical actuator 40 and coupled fluid control valve 42, as well as an electro-pneumatic actuator 44 and coupled fluid control valve 46, and other field instruments 48, such as electro-pneumatic positioners, valve controllers, etc. While the aforementioned system components are shown on the same pipeline, it is to be understood that they can be on different pipelines or branch lines, etc. A significant advantage of the electro-mechanical actuator 10 of the present invention is the capability to control other instruments and actuators on auxiliary control lines 50 and to monitor such control actions on auxiliary travel input lines 52. Each of the pair of auxiliary travel input lines 52 includes a limit open line 52a and a limit closed line 52b, similar to the lines 34, 36.

Accordingly, in response to a control signal from computer 30 to the control unit 24, an auxiliary control output on a respective line 50 activates for instance the electro-mechanical actuator 40. Thus, the electro-mechanical actuator 10 can be utilized to activate another electro-mechanical actuator in the system such as actuator 40, or other types of instruments such as the electro-pneumatic actuator 44 and field instrument 48 as well as to monitor on respective auxiliary lines 52 when these devices have reached the desired control state in response to the control signal, such as valve fully opened or valve fully closed.

Figure 2:
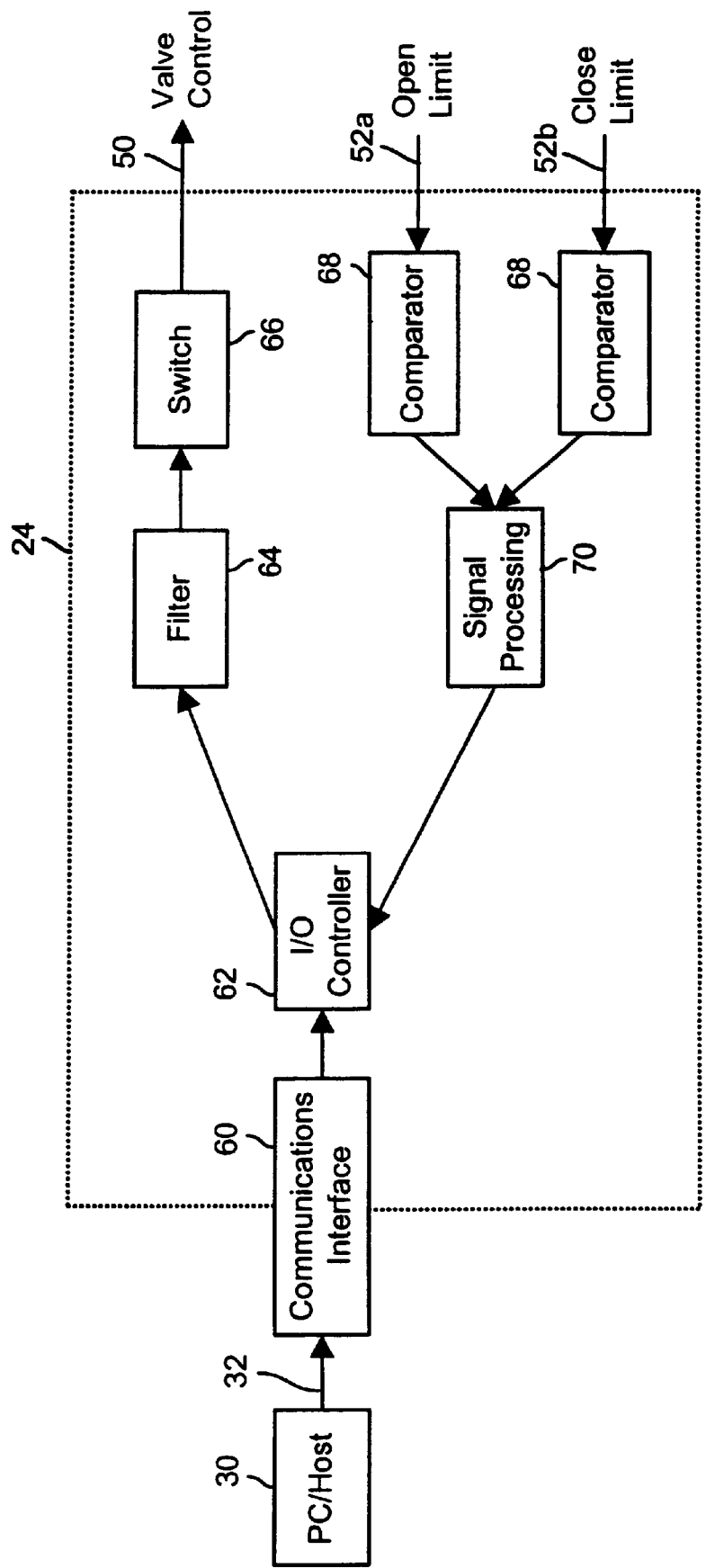
FIG. 2 is a schematic block diagram illustrating the auxiliary control signal lines provided by the electro-mechanical actuator of FIG. 1 in response to a personal computer or host computer for controlling at least two other field instruments and auxiliary travel input lines for monitoring the limit open and limit closed travel positions of the other field instruments.

Reference may be made to FIG. 2 wherein there is illustrated the computer 30 providing a control signal to a communications interface 60 such as a communication bus within the control unit 24. An input/output controller 62 couples the control signal from the communications interface 60 to a suitable filter 64 or other type of signal processor, for actuating a relay or other suitable switch 66. The resulting control signal on a respective auxiliary control line 50 of the electro-mechanical actuator 10 is coupled to one of the other field instruments, i.e., electro-mechanical actuator 40, or electro-pneumatic actuator 44 or other actuators 48 to open or close the associated valves 42, 46, 54. A respective auxiliary control line S0 is coupled to a respective field instrument.

The valve fully opened or valve fully closed state of the valve, for example, of valve 46, is monitored by a respective pair of auxiliary travel input lines 52 for coupling this information back to the control unit 24 of the electro-mechanical actuator 10. For example, the limit open state of the valve 46 is coupled on auxiliary travel input line 52a to a comparator 68 detecting the condition or state of the limit open sensor and, if desired, through a signal processor 70 to the input/output controller 62. If the limit open state of valve 46 has been reached, conventional limit sensors in the valve provide the limit open signal on line 52a to signal the input/output controller 62 to discontinue the valve opening control signal on the auxiliary control line 50 to the electro-pneumatic actuator 44. A pair of auxiliary travel input lines 52a, 52b is coupled to a respective field instrument.

A similar monitoring of the limit closed state of valve 46, for instance, through conventional limit sensors in the valve provides a closed limit signal on the respective auxiliary travel input line 52b for coupling to the input/output controller 62 so that when the closed limit of valve 46 is reached the valve closing control signal on the respective auxiliary control line 50 to the electro-pneumatic actuator 44 is discontinued.

Accordingly, a significant advantage of the unique electro-mechanical actuator 10 of the present invention is the capability to control and monitor a plurality of other field instruments and actuators through this unique electro-mechanical actuator.

The foregoing detailed description has been given for clearness of understanding only, and no unnecessary limitations should be understood therefrom, as modifications will be obvious to those skilled in the art.

What is claimed is:

1. An electric actuator for operating a fluid control valve and controlling the operation of a plurality of field instruments having an associated fluid control valve, said electric actuator comprising:

a drive unit having an output for coupling to said fluid control valve for opening and closing the valve;

an electric motor coupled to the drive unit for driving the drive unit in response to open and close power levels;

a control unit coupled to a power source and supplying said open and close power levels to the electric motor for opening and closing the valve;

said control unit including auxiliary control means for responding to an initiation signal and providing auxiliary control power levels to said plurality of field instruments to control the operation of said field instruments in the opening and closing of said associated fluid control valve;

said auxiliary control means includes auxiliary control output lines for connection to said plurality of field instruments to provide auxiliary control open and close power levels to a selected field instrument to control the opening and closing travel of a fluid control valve associated with said selected field instrument; and said auxiliary control means further includes auxiliary monitoring means for monitoring the fully closed and fully open state of each of the valves associated with each of said field instruments and providing a respective signal indication thereof to said auxiliary control means, and a respective pair of auxiliary travel input lines for connection to said plurality of field instruments for respectively monitoring and coupling said fully closed and fully open state of each of said associated valves to said auxiliary monitoring means and to discontinue said auxiliary control open and close power levels to respective ones of said field instruments upon sensing the fully closed or fully open state of said associated valve has been reached.

2. An electric actuator according to claim 1, wherein said field instruments include a plurality of electro-mechanical actuators and electro-pneumatic actuators each with an associated fluid control valve.

3. An electric actuator according to claim 2, wherein each of said field instruments is coupled to a respective auxiliary control output line and to a respective pair of auxiliary input lines.

* * * * *